Patented July 27, 1937

2,088,347

UNITED STATES PATENT OFFICE 2,088,347

MANUFACTURE OF ANHYDRIDES OF CITRACONIC ACID AND ITACONIC ACID

Georg Scheuing and Bruno Walach, Nieder-Ingelheim-on-the-Rhine, Germany, assignors to the firm: C. H. Boehringer Sohn A. G. Chemische Fabrik, Nieder-Ingelheim-on-the-Rhine, Germany, a company of Germany No Drawing. Application June 22, 1935, Serial No. 28,016. In Germany July 7, 1934

5 Claims. (Cl. 202—52)

Citraconic acid and itaconic acid have heretofore been obtained by the pyrogenous decomposition of crystalline citric acid. Small quantities of the crystalline citric acid are heated and the decomposition products which distill over are collected. The yields obtained by this method of working have not been very satisfactory. As stated by Fittig in the "Annalen der Chemie" Vol. 188, page 72, 217 grams of citraconic anhydride can be obtained from 1000 grams of citric acid by this process. In addition, it is necessary not to carry out the process with the entire quantity at once, but in a plurality of small individual distillations. The reason for the poor yields is to be sought in the fact that when crystalline citric acid is heated, some of the citric acid is decomposed with the formation of unwanted by-products and carbonaceous residues, in addition to the desired formation of citraconic anhydride or itaconic anhydride, which takes place by the removal of 3 mols of water (1 mol. of water of crystallization and 2 mols of water of constitution) and 1 mol. of carbon dioxide.

According to the invention, substantially better yields of citraconic acid and itaconic acid are obtained by not commencing with crystalline citric acid but by employing a concentrated solution of citric acid and allowing this solution to drop into a pre-heated vessel. Consequently, only small quantities of citric acid are subjected to heating each time and the resulting reaction products are distilled in proportion as they are formed. The duration of the heating of the citric acid is consequently much shorter than in the case of the known method of working. The occurrence of intermolecular reactions and the resulting formation of reaction products other than citraconic acid and itaconic acid are prevented by the dilution employed for the citric acid and by the immediate superheating without previous, long-continued heating up to the reaction temperature.

For carrying out the process according to the invention, a concentrated aqueous citric acid solution is allowed to run into an evacuated distillation apparatus heated to 230° C. or still higher. The rate at which the solution is allowed to run in is regulated in accordance with the rate of the distillation of the reaction products which consists of a mixture of citraconic anhydride and itaconic anhydride.

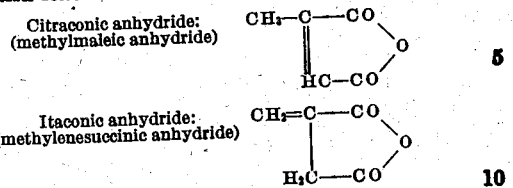

Citraconic anhydride: (methylmaleic anhydride)

and

Itaconic anhydride: (methylenesuccinic anhydride)

are isomeric with each other, this being a case of position isomerism based on a displacement of the double bond. Mesaconic acid, which is isomeric with citraconic acid after the manner of the fumaric acid-maleic acid isomerism due to a different geometrical arrangement of the substituents, does not form any anhydride and therefore is not formed directly in the pyrogenous decomposition of citric acid.

The residues remaining in the distillation vessel in the new process are very slight. They are mainly the non-volatile impurities of citric acid, together with only small amounts of carbonized decomposition products.

Since itaconic anhydride, especially at higher temperatures, is converted into citraconic anhydride by re-arrangement, the quantitative proportions of the two corresponding isomers depends upon the temperature and the apparatus employed. The degree of vacuum is without any considerable importance for the present process.

The free acids are obtained by heating the mixture of citraconic anhydride, itaconic anhydride and water which is first obtained. Hydration of the anhydrides even takes place partly during the condensation of the distillation products. By means of fractional condensation, however, the anhydrides themselves may also be obtained in a good yield.

The improved yields effected by the invention in the manufacture of citraconic and itaconic acids signify a considerable advance in the art, since both acids may be employed inter alia for the synthesis of synthetic resins and assistants in the textile industry.

The following two examples will serve to illustrate the invention more particularly:

Example 1

2 kilograms of citric acid (=9.5 mols corresponding to 28,500 cc. of n/1 acid) are dissolved hot in 800 cc. of water. The solution is allowed to run into a copper vessel of about 5 litres capacity at an oil-bath temperature of 280° to 300° C. and a vacuum of 30 to 40 mm. of mercury, the rate at which the solution is allowed to run into the vessel being regulated so that the pressure does not rise above 40 mm. of mercury. With the apparatus employed, the running in of the citric acid solution lasts 4 hours. The distillate obtained amounts to 2,300 grams. After heating the distillate to dissolve the partly oily and partly crystalline anhydride, the solution contains 18,000 cc. of n/1 acid=9.0 mols=95% of the theoretical yield of dibasic acid. About 84% of this is itaconic acid and the remainder is citraconic acid.

Example 2

2 kilograms of citric acid in the form of a 42% aqueous solution are allowed to run into the same apparatus as that employed for Example 1 in 6 hours at a vacuum of 80 to 90 mm. of mercury and at an oil bath temperature of 320° to 350° C. In the distillate there is obtained, after dilution with water, a 91% yield of a mixture of citraconic acid and itaconic acid in the proportion of 55:45.

We claim:—

1. A process for the manufacture of the anhydride of the citraconic acid and of the anhydride of the itaconic acid, consisting in progressively introducing a concentrated aqueous citric acid solution into an evacuated vessel heated to 230° C. to 350° C. and subjecting said solution therein to a pyrogenous decomposition in such a manner, that at any time only small amounts of citric acid are subjected to said pyrogenous decomposition.

2. A process for the manufacture of the anhydride of the citraconic acid and of the anhydride of the itaconic acid, consisting in progressively introducing a concentrated aqueous citric acid solution into an evacuated vessel of a material of high heat conductivity, such as copper, heated to 230° C. to 350° C. and subjecting said solution therein to a pyrogenous decomposition in such a manner, that at any time only small amounts of citric acid are subjected to said pyrogenous decomposition and that the resulting decomposition products of each small amount are distilled substantially in proportion as they are formed.

3. A process for the manufacture of the anhydride of the citraconic acid and of the anhydride of the itaconic acid consisting in progressively introducing a concentrated aqueous citric acid solution into an evacuated vessel heated to 230° C. to 350° C. and subjecting said solution therein to a pyrogenous decomposition in such a manner, that at any time only small amounts of citric acid are subjected to said pyrogenous decomposition and that the rate of the introduction of said solution into said vessel substantially corresponds to the rate of the distillation of the decomposition products.

4. A process for the manufacture of the anhydride of the citraconic acid and of the anhydride of the itaconic acid favoring the yield of the anhydride of the itaconic acid, consisting in progressively introducing a concentrated aqueous citric acid solution into an evacuated vessel heated to 280° C. to 300° C. while maintaining a pressure of 30 to 40 mm. mercury and subjecting said solution in said vessel to a pyrogenous decomposition in such a manner, that at any time only small amounts of citric acid are subjected to said pyrogenous decomposition and that the resulting decomposition products of each small amount are distilled substantially in proportion as they are formed.

5. A process for the manufacture of the anhydride of the citraconic acid and of the anhydride of the itaconic acid favoring the yield of the anhydride of the citraconic acid, consisting in progressively introducing a concentrated aqueous citric acid solution into an evacuated vessel heated to 320° C. to 350° C. while maintaining a pressure of 80 to 90 mm. mercury and subjecting said solution in said vessel to a pyrogenous decomposition in such a manner, that at any time only small amounts of citric acid are subjected to said pyrogenous decomposition and that the resulting decomposition products of each small amount are distilled substantially in proportion as they are formed.

GEORG SCHEUING.
BRUNO WALACH.